United States Patent
Krehbiel et al.

[15] 3,659,325
[45] May 2, 1972

[54] CONTROL VALVE METHOD OF MANUFACTURE

[72] Inventors: Robert D. Krehbiel; Warren E. McCammond, both of Hutchinson, Kans.

[73] Assignee: The Cessna Aircraft Company, Wichita, Kans.

[22] Filed: June 3, 1970

[21] Appl. No.: 54,033

Related U.S. Application Data

[62] Division of Ser. No. 772,668, Nov. 1, 1968.

[52] U.S. Cl. ..................................................29/157.1 R
[51] Int. Cl. ................B21d 53/00, B21k 29/00, B23p 15/26
[58] Field of Search ..............29/156.7, 157.1, 558; 137/375, 137/625.48; 251/368

[56] References Cited

UNITED STATES PATENTS

| | | | |
|---|---|---|---|
| 2,822,824 | 2/1958 | Glower et al. | 251/368 X |
| 2,985,566 | 5/1961 | Tsien et al. | 29/157.1 R X |
| 3,206,837 | 9/1965 | Holmes | 29/157.1 R |

*Primary Examiner*—John F. Campbell
*Assistant Examiner*—Victor A. Di Palma
*Attorney*—Gregory J. Nelson and Hubert E. Miller

[57] ABSTRACT

A fluid control valve including a spool whose end exposable to corrosion environment is tapered to a reduced diameter and coated with corrosion resistant material. The reduced diameter facilitates fast, economical final machining and sizing of the spool without damaging the protective coating, for selective fitting within a fluid control valve body bore.

4 Claims, 2 Drawing Figures

PATENTED MAY 2 1972

3,659,325

CONTROL VALVE METHOD OF MANUFACTURE

This is a division of application Ser. No. 772,668, filed Nov. 1, 1968, now U.S. Pat. No. 3,557,824.

This invention relates to fluid flow control valves. More specifically, the invention relates to an improved flow control valve and valve spool and method of manufacturing same.

Reciprocating spool type directional control valves comprise in general a body having a longitudinal spool bore and fluid carrying passages communicating with the bore. A spool reciprocable within the bore can be positioned as desired to selectively interconnect certain passages through grooves in the spool and block communication between other passages by lands on the spool that fit closely to the body at locations between the passages. For proper operation, it is therefore necessary that the cooperating elements, the spool bore and diameter of the spool lands, be properly sized to very close dimensions.

Rather than machine the valve body spool bore and valve spool to exacting tolerances, it has been found more practical and economical to selectively fit the spools and bodies. Selective fitting generally includes the steps of machining the two cooperating elements to less exacting tolerances, measuring the critical dimension of one of the elements, then machining the second element to fit this dimension, and then selectively matching a pair of elements which fit within the tolerance required. Thus, the spool is initially made to oversize dimension and after determining the bore sizes of bodies available, is then machined to a final dimension closely matching the available body bore sizes. It has been found feasible only to perform the final machining operation on the spool rather than the body bore; that is, size the spool to fit the bore rather than size the bore to the spool.

This final machining has created a problem in that it will remove any protective material, such as chrome plating, on the spool. A prior solution, plating the spool after final sizing, unduly delays production and assemblage of the valves, or necessitates a large inventory of finally machined and chrome plated spools in all the numerous sizes which may be required to fit the bodies.

It can thus be seen that a valve spool capable of being finally machined without injuring or removing a protective coating on the spool, will enhance the production and manufacture of reciprocating spool control valves. Leaving this precise spool sizing as the final step in the valve manufacture will also reduce handling of the completed spool and attendant accidental damage.

Accordingly, it is an object of this invention to provide a directional control valve construction readily adaptable to a final spool machining operation.

Another object of this invention is to provide an improved method of manufacturing a reciprocating control valve spool.

A more particular object of the invention is to provide a valve spool capable of being machined without injuring the protective material covering a portion of the spool.

Yet another object is to provide a control valve assembly including a spool of selective fit diameter with a chrome plated, reduced diameter end portion and a tapered diameter portion extending from the reduced to the selective fit diameter, and a resilient element capable of sealing against both the reduced end and tapered portions of the spool.

Other objects and advantages of the invention will become apparent in the following description and accompanying drawings in which.

DESCRIPTION

Figure 1:
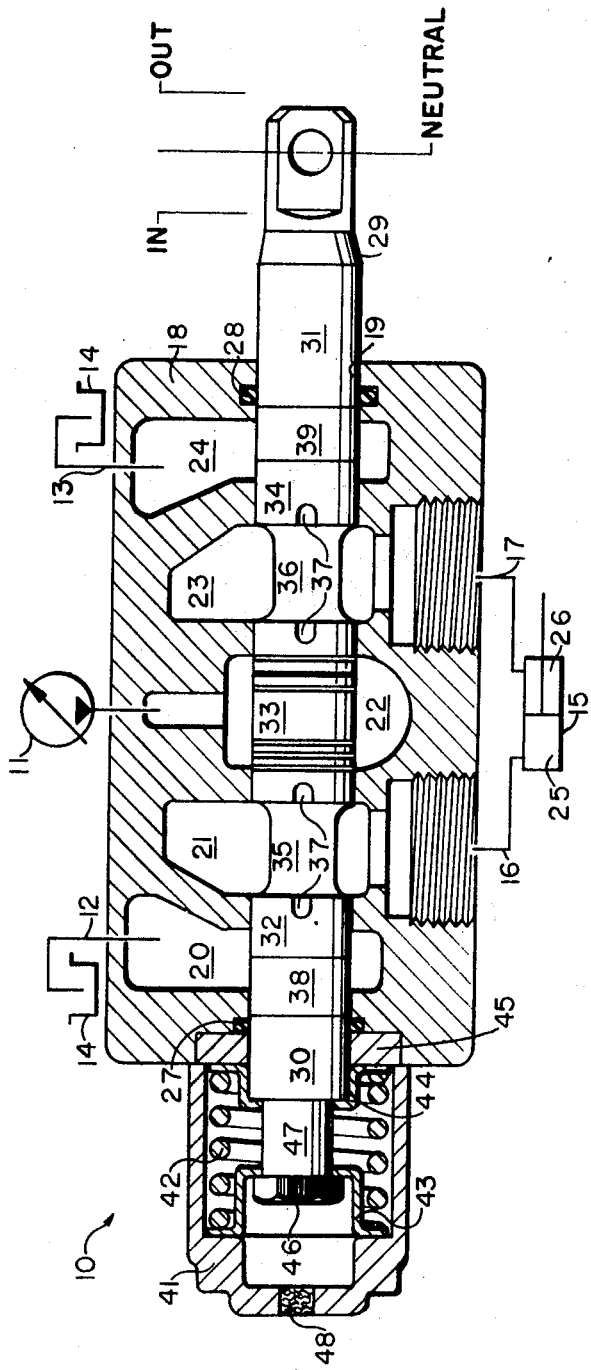
FIG. 1 is a partial longitudinal section of a control valve built in accordance with the invention and additional schematic representation of a typical hydraulic system.

FIG. 1 illustrates a directional control valve 10 interposed in a fluid power system including a source of fluid 11, fluid return lines 12 and 13 leading to reservoir 14, and a double acting linear cylinder motor 15. Valve 10 directs fluid flow between the pump and reservoir and either end of cylinder 15 through conduits 16 and 17.

Valve 10 includes a cast body 18 having a longitudinal bore 19 and five transverse passages 20–24 intersecting bore 19 at spaced positions. Passages 20 and 24 communicate with low pressure return lines 12 and 13 while work passages 21 and 23 respectively connect with ends 25 and 26 of cylinder 15 through conduits 16 and 17. Variable displacement fluid pump 11 supplies motive fluid to passage 22 in body 18. Near either end of bore 19 are seal receiving grooves in body 18 in which are disposed resilient sealing member O-rings 27 and 28.

Slidably disposed in and closely fitting bore 19 is control spool 29 having ends 30 and 31 extending out of the body 18. Land portions 32, 33 and 34 of spool 29 cooperate with the body lands formed between the passages in body 18 to isolate from one another the fluid passages 20 through 24 when the spool is in the neutral position shown. A pair of grooves 35 and 36 of substantial length interconnect the body fluid passages in a predetermined manner as spool 29 is manually shifted to cylinder actuating positions as will be more fully described. Metering notches 37 on spool 29 provide precise control of fluid flow to and from cylinder 15 and speed of movement of the cylinder rod and piston.

The outer ends 30 and 31 of the spool have a diameter slightly less than the diameter of lands 32, 33 and 34. The outer portions of the spool, including sections 30 and 31, are chrome plated to deter corrosion of the portions of the spool extendable outside body 18. Section 38 of the spool intermediate reduced diameter portion 30 and outer land 32, is gradually tapered with a diameter smoothly varying from the end diameter to the land diameter. A similar tapered portion 39 is present between outer land 34 and reduced diameter end 31. As the spool is shifted within bore 19, seals 27 and 28 can compress against both the reduced diameter ends and tapered portions of spool 29 to prevent fluid leakage from body 18 through bore 19 in all spool positions. The tapered portions preclude sharp edges on the spool from passing through and cutting O-rings 27, 28, as well as reducing sticking and binding of the spool within bore 19.

Figure 2:
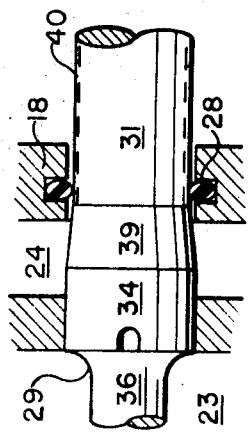
FIG. 2 is an enlarged view of one end of the valve spool of FIG. 1.

FIG. 2 is an enlarged view of the right end of spool 29 clearly showing the tapered portion 39 in exaggerated detail. The chrome plating 40 (also illustrated in exaggerated proportion) on end section 31 is shown by the dotted line and covers the complete surface of the spool end which may protrude from the body in various spool positions. Though the plating 40 is shown ending at approximately the start of the taper 39, it may extend onto the taper or whole spool if desired. End portion 31 is diametrally reduced from land 34 sufficiently that subsequent machining of the spool lands, to be presently described, will not touch chrome plating 40 on end 31. The length of taper portion 39 can vary substantially; however, it has been found desirable in some applications to position taper 39 so that it cannot span from passage 24 to passage 23 and allow leakage therebetween, as spool 29 is moved in bore 19. Thus, as spool 29 is moved leftwardly to the position denoted "in," taper portion 39 will not extend into passage 23. Taper 38 is similarly located to inhibit undue leakage between passages 20 and 21 when the spool is moved rightwardly to its "out" position.

A spool centering assembly contained within a cap 41 bolted to body 18 is attached to the left end of spool 29 to bias the spool to its neutral position. Spring 42 urges a pair of cup-shaped washers 43, 44, oppositely toward cap 41 and an insert washer 45 which is disposed in a recess in body 18. Cup washer 43 bears against the head of a bolt 46 threadably attached to the left end of spool 29, while cup washer 44 is urged directly onto the left end of the spool. A hollow, cylindrical spacer 47 through which bolt 46 extends, separates the head of bolt 46 from the left end of the spool. Spacer 47 fits loosely within central openings in cup washers 43 and 44 to slide easily therethrough during movement of spool 29. Metallic filter packing material 48 is contained within a pressure relieving breather opening in cap 41, whereby the interior of the cap and portion 30 of spool 29 are subject to the corrosional environment surrounding body 18.

Shifting of spool 29 either direction from the center neutral position shown compresses centering spring 42 through movement of one of washers 42, 43. Upon consequent release of the spool, spring 42 returns spool 29 to neutral.

In operation of valve 10, moving spool 29 rightwardly directs motive fluid to chamber 25 of cylinder 15 by interconnecting inlet passage 22 with cylinder work passage 21 through groove 35. Washer 43 is constrained by bolt 46 to move with spool 29 toward washer 44 and compress spring 42. Consequent rightward movement of the cylinder piston and rod displaces fluid out of chamber 26 into conduit 17 and cylinder work passage 23 from where it is directed through groove 36 into fluid drain passage 24. Releasing spool 29 then allows spring 42 to urge cup washer 43 leftwardly and return spool 29 to neutral, wherein work passages 21 and 23 are isolated and the piston of cylinder 15 is hydraulically locked in position. Similarly, leftward spool travel from neutral directs fluid from pump 11 through spool groove 36 into cylinder chamber 26, and directs displaced fluid from chamber 25 and passage 21 through groove 35 to drain passage 20.

MANUFACTURE

Certain methods of manufacture of valve spools such as spool 29 require a final, precise machining of the diameter of lands 32, 33, 34, to a desired dimension. Further, to facilitate fast, economical production of the control valve as well as to minimize handling and attendant damage, it is desirable that such final machining and sizing be the last step in manufacture prior to assembling the body, spool and other components of the valve 10. Consequently, completing time consuming steps such as chrome plating of the spool prior to final machining as contemplated by the present invention, makes final sizing techniques feasible to valve spool mass production.

The valve production technique herein termed selective fitting of spools and bodies is an example of a method of manufacture advantageously utilizing a final sizing machining. From a single stock of slightly oversized spools, final machining of the spools to varying diametral dimensions dictated by valve bodies available for assembly, precludes a stockpile of spools for each diameter which may be required by the valve bodies.

Spool 29 is machined from a cylinder bar stock to the desired design leaving a substantially oversized basic diameter larger than bore 19 of body 18. Ends 30 and 31 are ground to a reduced diameter less than, and outside the tolerance range of valve body bore 19 diameter. The tapered surfaces 38 and 39 are machined at the same time.

A layer of chrome of desired thickness is electrolytically deposited on and bonded to ends 30 and 31, after which spool 29 can be stockpiled.

Body 18 is completely machined, including bore 19, to required dimensions, and the actual bore diameter is recorded when it is inventoried and stored.

When it is desired to build and assemble several control valves 10, each spool 29 is finally machined to a land diameter closely matching the bore diameter of one of the bodies available for assembly. For example, to fit a spool within 0.0001 in. to a body bore machined to a tolerance of 0.0015 in., the spool is machined by an external centerless grinder to any one of 15 different dimensions. The final dimensions of the spool lands are recorded, and the spools and bodies are subsequently selectively paired for assembly such that spools 29 fit as closely to bores 19 as required for proper valve operation.

The foregoing description of control valve 10 and its manufacture is to be considered as exemplary in nature and not limiting to the scope and spirit of the invention as set forth in the appended claims.

Having described my invention with sufficient clarity that those skilled in the art may make and use it, I claim:

1. A method of manufacture of a valve spool having at least one end to be covered with protective material comprising the sequential steps of:
    a. machining to a slightly reduced diameter said one end and machining a tapering diameter portion from said one end inwardly to the remainder of said spool;
    b. applying a thin layer of protective material on said one end; and
    c. final machining said remainder of the spool to a predetermined diameter greater than said reduced diameter.

2. A method of manufacture as in claim 1, wherein said reduced diameter and tapering diameter are machined in the same operation, and said protective material is metallic and bonded to said one end.

3. A method of manufacturing a fluid control valve comprising the steps of:
    a. providing a body having a longitudinal bore of predetermined diameter;
    b. supplying a spool having a basic diameter larger than the body bore diameter;
    c. machining to a reduced diameter an end portion of said spool extendable from the body;
    d. providing a gradual taper on said spool from said reduced diameter to said basic diameter;
    e. applying a thin layer of protective material on said one end;
    f. subsequently final machining said spool without removing the protective material on said one end to a desired final diameter intermediate said reduced diameter and body bore diameter; and
    g. assembling said spool into the bore of said body.

4. A method of manufacture as in claim 3, wherein applying a thin layer of protective material comprises electrolytically depositing chrome onto said one end.

* * * * *